Patented Mar. 6, 1928.

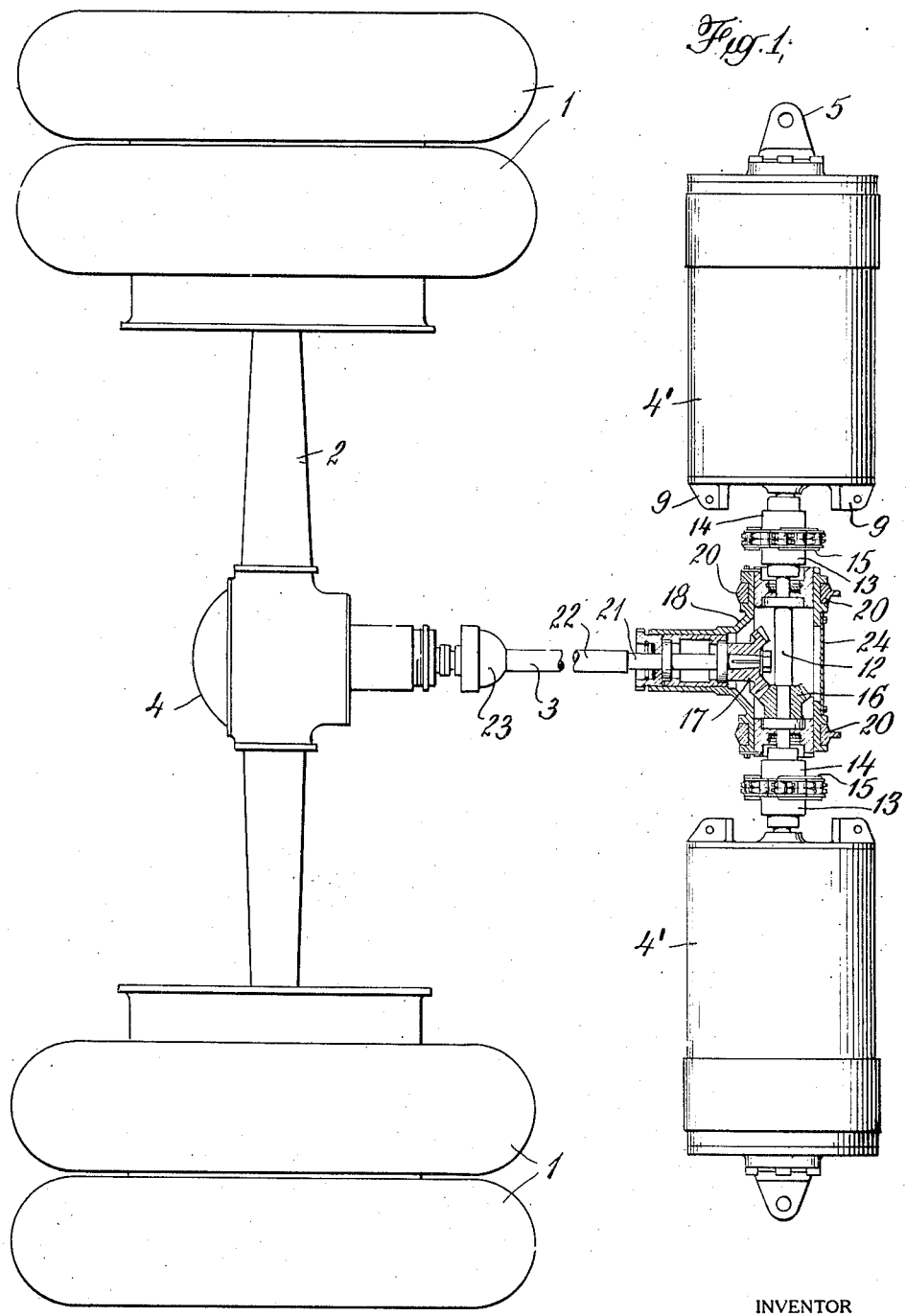

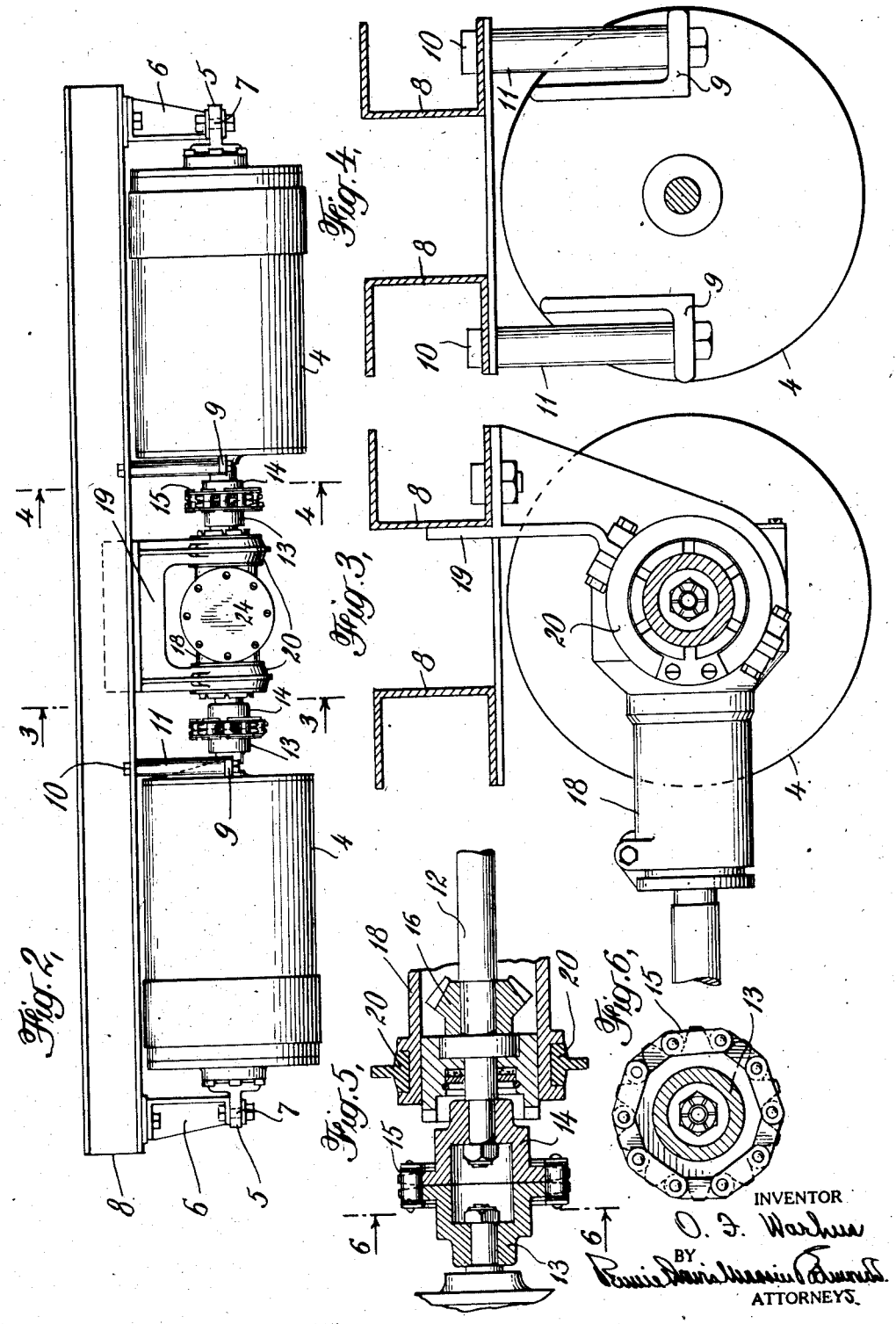

1,661,780

UNITED STATES PATENT OFFICE.

OLIVER F. WARHUS, OF ALBANY, NEW YORK, ASSIGNOR TO VERSARE CORPORATION, A CORPORATION OF NEW YORK.

PROPELLING AND TRANSMISSION MECHANISM FOR VEHICLES.

Application filed January 31, 1925. Serial No. 6,154.

This invention relates to propelling and transmission mechanism for motor driven vehicles.

The invention is particularly applicable to motor trucks driven by electric motors, but it is also applicable to motor vehicles having any type of propelling motor.

All motor vehicles having the usual spring suspension or its equivalent, and in which the driving power is transmitted from a motor to the driving axle must be provided with some means in the power transmission mechanism to permit vibration of the axle caused by irregularities in the road surface. It is customary to provide a universal joint for this purpose, but if the universal joint is the sole means of allowing the vibratory movement of the axle, it is subjected to considerable strains and wear. It has been proposed to relieve the universal joint of some of this duty by pivotally supporting the motor so that the motor may oscillate with the axle, but this arrangement presents practical difficulties and is not altogether satisfactory.

One object of the present invention is to provide an improved propelling and transmission mechanism in which the motor may be rigidly supported and in which special means, other than a universal joint, is utilized to permit the oscillatory or vibrating movement of the axle.

Another object is to provide an improved propelling and transmission mechanism in which the unsprung weight of the parts is reduced to a minimum.

A further object is to so position the driving motor that the oscillatory movements of the axle may take place about the axis of rotation of the motor.

Another object is to provide a propelling and transmission mechanism in which the cumulative power of two motors is transmitted and distributed differentially to at least two traction wheels, as distinguished from the provision of a separate motor for each traction wheel.

Another object is to provide an improved propelling system in which the cumulative power of two electric motors is transmitted to at least two traction wheels, and in which the driving power and also the braking action of the two motors is differentiated to all of the wheels, whereby if one motor should go bad the other will drive and brake all of the wheels.

The invention further aims to utilize the cumulative power of two motors to differentially drive either two or four traction wheels.

Certain other objects of the invention will appear from the following description.

The invention is illustrated in the accompanying drawings in which,

Fig. 1 is a plan view showing the improved transmission system applied to two traction wheels of the vehicle;

Fig. 2 is a vertical elevation of the mechanism shown in Fig. 1 viewed from the side opposite the traction wheels;

Fig. 3 is a transverse section taken on the line 3—3 of Fig. 2;

Fig. 4 is a transverse section taken on the line 4—4 of Fig. 2;

Fig. 5 is a detail sectional view illustrating the means employed for connecting the motors with the driving shaft, and Fig. 6 is a transverse section taken on the line 6—6 of Fig. 5.

The improved propelling and transmission mechanism has been illustrated in the drawing as applied to two traction wheels 1 of the vehicle. If the vehicle body is mounted on trucks, the wheels 1 may be the rear wheels of any one or more of the trucks, or if the vehicle is of that type in which no trucks are employed, the wheels 1 may be the rear wheels of the vehicle. If the vehicle has more than two power driven traction wheels, the power unit and transmission mechanism may be duplicated for each pair of additional power driven traction wheels or the mechanism may be modified as hereinafter described to transmit power from a single power unit to four traction wheels.

The traction wheels 1 are mounted on a driving axle located within the axle housing 2 in the usual manner. A propeller shaft 3 is arranged substantially at right angles to the axle housing 2 and is operatively connected with the axle within the housing by the customary reduction differential gearing located in the differential housing 4.

The propeller shaft 3 is adapted to be driven by one or more motors so positioned that the axis or axes thereof are substantially parallel with the axle of the traction wheels 1. In the present instance two motors 4' are employed and they are preferably of the electric type although in accordance with some phases of the invention one or more motors of other types may be employed. Each motor is rigidly supported from some part of the vehicle in the manner shown in Figs. 1, 2 and 4. As shown in these figures, the outer end of each motor casing has a lug 5 secured thereto which is bolted to the lower end of a bracket 6 by means of a bolt 7. The bracket 6 is rigidly supported from one or more transverse frame members 8 which may be frame members of the vehicle body or frame members of one of the trucks which support the body. The inner end of each motor casing is provided with a pair of lugs 9 each of which is clamped by means of a bolt 10 against the end of a relatively long spacer 11 located between the lug and one of the frame members. It will therefore be seen that the entire weight of each motor is supported by the frame of the vehicle body or the frame of the truck. The motors 4 are arranged with their axes in substantial alignment with each other and also in alignment with a driving element or driving shaft 12. Both motors are connected with the driving shaft 12 so that their cumulative power is utilized to rotate it.

The means employed for connecting each motor shaft with the driving shaft 12 is shown in detail in Figs. 5 and 6. It preferably comprises a sprocket member 13 rigidly clamped to the armature shaft of the motor, and a corresponding sprocket member 14 rigidly clamped to one end of the driving shaft 12. The sprockets on the two sprocket members are positioned closely adjacent to each other as shown in Fig. 5 with their teeth in substantial registry. A sprocket chain 15 passes around the two sprockets in such a manner that the sprockets are coupled together and are caused to rotate together. As will be clear from Figs. 5 and 6 each tooth of one sprocket is mechanically coupled with the corresponding tooth on the adjacent sprocket by the links and cross members of the chain. In other words, each tooth opening in the chain receives two teeth, one tooth being on one sprocket and the other tooth being on the adjacent sprocket. The ends of the chain may be held together by a removable pin so that removal of the pin permits the chain to be removed, thus uncoupling the two sprockets. When the sprockets are uncoupled the corresponding motor may be readily removed for inspection, repair or replacement by loosening its supporting bolts 7 and 10. The chain and sprocket coupling devices constitute simple and effective means for coupling the motors to the driving shaft 12. They also constitute detachable connections which may be quickly and easily operated to disconnect the motors from the driving shaft and permit their removal. The two chain and sprocket couplings permit just enough play to compensate for inexact alignment between the motor shafts and the driving shaft 12.

The driving shaft 12 is provided with a bevel gear 16 meshing with a bevel gear 17 keyed to the end of the propeller shaft 3. The ratio of the gears 16 and 17 is preferably such that there is a reduction in speed from the gear 16 to the gear 17 and a corresponding increase in power.

The gears 16 and 17 are enclosed in a housing 18 in which the driving shaft 12 and the end of propeller shaft 3 are permitted to rotate by the provision of suitable bearings. The housing 18 is supported from the body or truck frame 8 by means of a bracket 19. The bracket 19 is provided with two strap-like members 20 each of which encircles one end portion of the housing 18, the housing preferably being provided with grooves or recesses to receive the straps as shown in Fig. 1. The straps are not clamped tightly to the housing, but permit the housing to oscillate or rotate in them. It will now be seen that the housing 18 is directly supported by the body or truck frame of the vehicle in such a manner that it is free to move or oscillate in the straps 20 about the axis of the driving shaft 12. The end of the propeller shaft 3 being journaled in the housing 18 has its weight at that end supported by the housing and in turn by the body or truck frame of the vehicle. As the housing 18 is free to oscillate about the axis of the driving shaft 12 it is obvious that the traction wheels 1, the axle housing 2 and the propeller shaft 3 are also free to oscillate vertically about the axis of the driving shaft 12. It will be understood, in this connection that this oscillating movement is caused by the irregularities in the road surface and is permitted by the usual spring suspension between the traction wheels and the vehicle truck or vehicle body. Otherwise stated, it is due to the provision of the spring suspension that the oscillation or vibration of the traction wheels takes place and this must be allowed for in the transmission mechanism. In order to permit this oscillating motion in a free manner without any strain on the parts, the propeller shaft 3 is preferably provided with a telescopic connection, the two parts of which are represented at 21 and 22. The propeller shaft 3 is also preferably provided at its rear end with a universal joint 23 of any suitable construction to allow for slight angular changes and to compensate for any irregularities in the transmission.

The side of the housing 18 opposite the propeller shaft 3 is provided with a removable plate 24. This makes it possible to utilize the same power unit for driving four wheels of the truck or vehicle. If this is desired, it is only necessary to remove the plate 24 and to connect a second propeller shaft to the gearing within the housing, it being understood that the second propeller shaft will extend toward and be properly connected with the additional traction wheels located at the other side of the motors.

The following are some of the advantages of the improved propelling and transmission mechanism herein disclosed. Either motor may be quickly and easily removed by disconnecting the corresponding chain and sprocket coupling and then loosening the bolts which support the motor from the frame of the vehicle body or truck. The mechanism may be quickly converted into one which is adapted for driving four traction wheels instead of two. Inasmuch as reduction gearing is provided at two places, namely within the housing 18 and within the differential housing 4, the housing 4 may be made smaller than if the entire reduction were located therein. A small differential housing is advantageous because a large housing necessitates location of the vehicle or truck frame at a considerable distance from the ground in order to provide that amount of clearance above and below the housing which is necessary to permit vibration of the axle. In the present transmission mechanism there is less unsprung weight than in previous types because the entire weight of the motors and the weight of the housing 18 and the corresponding end of the propeller shaft is supported by the body or truck frame of the vehicle. The oscillatory movement of the traction wheels and propeller shaft caused by road shocks takes place about the axis of the shaft 12 and is permitted by the special mounting for the housing 18. This housing and its supporting means may be ruggedly constructed so as to resist the resulting wear at this point, or at least to make any resulting wear immaterial. Only one universal joint is required, and as the movement of the parts thereof is very slight the wear on the joint is reduced to a minimum. In this connection it will be noted that neither the universal joint 23 nor any other universal joint is called upon to stand the main oscillating motion of the traction wheels and propeller shaft. Should one of the motors go bad the other motor will drive both of the traction wheels as the same transmission connections are provided between the two motors and the traction wheels. There is a differential action at all times between the two motors and the traction wheels, as they are both connected to the traction wheels through the same differential gearing. When the braking action of the motors is utilized it is differentiated to the two wheels and if one of the motors should go bad a braking action will still be furnished by the other motor to the two wheels.

I claim:

1. Propelling mechanism for the traction wheels of vehicles comprising a driving axle with which the traction wheels are operatively associated, a propeller shaft disposed substantially at right angles with said axle and operatively connected therewith, a driving element disposed substantially parallel with said axle and operatively connected with the propeller shaft, and a motor whose axis of rotation is substantially in alignment with the axis of said driving element and a detachable self-aligning connection between the motor and said driving element to permit removal of the motor and alignment of the element therewith.

2. Propelling mechanism for the traction wheels of vehicles comprising a driving axle with which the traction wheels are operatively associated, a propeller shaft disposed substantially at right angles with said axle and operatively connected therewith, a driving element disposed substantially parallel with said axle and operatively connected with the propeller shaft, a motor at each end of the driving element for actuating the same, and a detachable self-aligning connection between each motor and the corresponding end of the driving element to permit removal of the motor and alignment of the element therewith.

3. Propelling mechanism for the transmission wheels of vehicles having a plurality of axles, comprising a gear housing located between two of said axles, gearing in said housing, a propeller shaft arranged substantially at right angles with the axis of rotation of the traction wheels, said propeller shaft extending from said gear housing and operatively connected to one of said axles to impart rotation thereto, means for imparting rotation to said propeller shaft through the gearing in said housing, and a removable portion on said housing whereby a second propeller shaft may be connected with the gearing in said housing to impart rotation to another of said axles.

4. Propelling mechanism for the traction wheels of vehicles having a plurality of axles comprising a gear housing located between two of said axles, gearing in said housing, a driving shaft disposed substantially parallel with the axis of rotation of the traction wheels and receiving power through said gearing, a propeller shaft operatively connected with said driving shaft for imparting rotation to one of said axles, a portion of said gear housing being removable whereby a second propeller shaft may be connected with the gearing in said housing to impart rotation to another of said axles.

5. Propelling mechanism for the traction wheels of vehicles having a plurality of axles comprising a gear housing located between two of said axles, gearing in said housing, a motor for driving said gearing, a driving shaft operatively connected with said gearing and adapted to receive power therethrough from said motor, a propeller shaft operatively connected to said driving shaft to impart rotation to one of said axles, and a removable plate on said housing located in alignment with said propeller shaft whereby a second propeller shaft may be connected with the gearing in said housing to impart rotation to another of said axles located at the side of said housing remote from said first-mentioned axle.

6. Propelling mechanism for the traction wheels of vehicles having a plurality of axles, comprising a gear housing located between two of said axles, gearing in said housing, a driving shaft located within said housing disposed substantially parallel to one of said axles, an electric motor operatively connected to each end of the driving shaft and having their axes of rotation substantially in alignment with the axis of said driving motor, a propeller shaft extending from said gear housing and operatively connected at one end to said gearing and at its other end to said axle to impart rotation thereto, and a removable portion on that side of the gear housing which is opposite the propeller shaft, whereby a second propeller shaft may be connected with the gearing in said housing to impart rotation to another of said axles.

7. Propelling mechanism for the traction wheels of vehicles comprising a driving axle with which the traction wheels are operatively associated, an axle housing, a rotary driving element whose axis of rotation is substantially parallel with said axle, a self-aligning joint forming part of the element, a propeller shaft operatively connecting the axle with said driving element, a housing inclosing at least a part of said driving element and the adjacent end of the propeller shaft and mounted for pivotal movement about the axis of said driving element, said housing being structurally independent of the axle housing, a universal joint in said propeller shaft which is subject to movement in an arc of a circle that is convex with respect to said housing, and a slip joint in the propeller shaft.

In testimony whereof I affix my signature.

OLIVER F. WARHUS.